Aug. 3, 1937.  W. DUBILIER  2,088,693
DIELECTRIC COMPOSITION
Filed Aug. 7, 1934
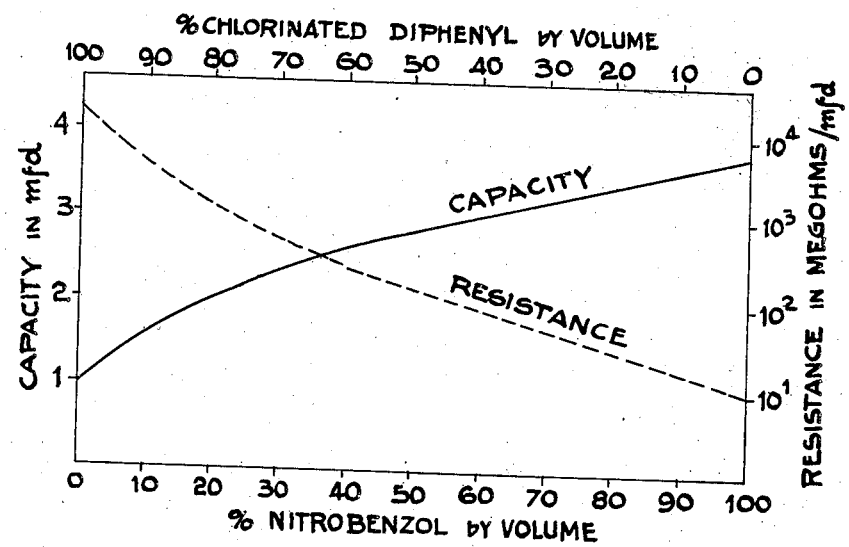
INVENTOR
WILLIAM DUBILIER
BY
ATTORNEY Patented Aug. 3, 1937

2,088,693

UNITED STATES PATENT OFFICE 2,088,693

DIELECTRIC COMPOSITION

William Dubilier, New Rochelle, N. Y., assignor to Cornell-Dubilier Corporation, New York, N. Y., a corporation of New York Application August 7, 1934, Serial No. 738,783
In Germany August 8, 1933

4 Claims. (Cl. 252—1)

This invention relates to insulating and dielectric materials, more particularly to a dielectric and/or impregnating liquid for electrical condensers or similar electric devices.

In electrical condensers employing oil or wax, such as paraffin either directly as a dielectric for the condenser or in which these compounds are used as an impregnating means of the fibrous layers separating the metallic condenser armatures, the capacity of the condenser is determined by the dielectric constant of the oil or wax used. By using a compound known under the trade-name of "Halowax", the capacity may be increased as compared to a condenser using ordinary oil or paraffin wax. There is however the disadvantage that "Halowax" is expensive and heavy and very often not without danger during handling and treatment. Besides this it has other well-known disadvantages when used in electric condensers which are well known in the art.

On the other hand, condensers employing a highly efficient insulating oil which has a dielectric constant similar to wax or paraffin as a dielectric or impregnating means, have the disadvantage that the oil is highly microscopic, causing the absorption of moisture which will greatly impair the efficiency and other electrical characteristics of the condenser, as is well known. To prevent this, great care must be exercised to keep the condenser oil tight.

It is an object of the present invention to provide a new insulating or dielectric material for electrical condensers or similar electric devices which is devoid of the above disadvantages.

It has been found that the use of nitrobenzol which has equal properties to oil, results in a considerably higher capacity for a condenser of given bulk and construction. Accordingly, it is proposed in accordance with the invention to use nitrobenzol as a dielectric and/or impregnating means for electric condensers or similar devices in particular condensers comprising metallic armatures with interposed absorbent separating elements.

It was further found that in a condenser of this type using nitrobenzol as a dielectric and/or impregnating means, the leakage resistance is not as high as in the case of an equivalent condenser using oil as a dielectric or impregnating liquid. However, for certain practical uses the leakage resistance is sufficiently high to enable satisfactory operation without excessive losses in the condenser.

It is a further object of the invention to provide a dielectric or insulating liquid comprising nitrobenzol in which the leakage resistance is increased as compared to a condenser employing pure nitrobenzol to adapt the condenser for use where decreased losses are required.

In accordance with the invention, there is added to the nitrobenzol a suitable compound adapted to increase the leakage resistance, either in the form of a pure mixture and/or chemical combination. It has been found that chlorinated diphenyl is especially suited for this purpose. Thus, for instance, by using a mixture of 50% nitrobenzol and 50% chlorinated diphenyl, a capacity increase of 2.6 times as compared to an equivalent condenser using ordinary oil and in addition a considerable increase of the leakage resistance as compared to a condenser using pure nitrobenzol is obtained. In a practical example, the leakage resistance in a condenser unit impregnated with nitrobenzol was about 100 megohms while when using the above mixture the resistance was increased to about 300 megohms.

The chart on the accompanying drawing is further explanatory of the novel results according to the invention. It illustrates the variation of the capacity and the resistance of the condenser with varying ratios of the constituents of the dielectric and/or impregnating mixture, in the example shown consisting of nitrobenzol and chlorinated diphenyl. The capacities are shown in microfarads and the resistance in megohms per microfarad and are related to a standard condenser unit of one microfarad impregnated with ordinary oil or paraffin.

As is seen, the capacity of the condenser using nitrobenzol mixed with chlorinated diphenyl is not as high as in the case where pure nitrobenzol is used. The values obtained however when employing the mixture are still high enough to enable a manufacture of a condenser with considerably decreased space and bulk and at lower cost. These advantages by far exceed the disadvantage of a somewhat decreased leakage resistance. A further advantage is the fact that the impregnating means is less inflammable than oil and is non-hydroscopic, resulting in a further simplification of the construction and manufacture of the condenser.

By using different mixing ratios of the nitrobenzol and chlorinated diphenyl it is easily possible, in accordance with the desired use of the condenser, to either increase the capacity at the expense of the resistance or vice versa. Thus, for instance, as seen from the drawing, when using a mixture of 70% nitrobenzol and 30% chlorinated diphenyl, a somewhat increased capacity and considerably decreased resistance is obtained as compared to a condenser with a 50–50 mixture.

In accordance with a further feature of the invention, it is furthermore possible to add a different substance to the nitrobenzol or mixture of nitrobenzol and chlorinated diphenyl having similar properties to chlorinated diphenyl for decreasing the resistance of the condenser, such as a suitable oil or similar material.

While a specific example of an impregnating mixture for electric condensers or similar devices has been given, it is understood that variations may be made coming within the broader scope of the invention as expressed in the appended claims.

I claim:

1. A dielectric material consisting of a liquid mixture of nitrobenzol and chlorinated diphenyl.
2. A dielectric material consisting of a liquid mixture of equal proportions of nitrobenzol and chlorinated diphenyl.
3. A dielectric composition consisting of chlorinated diphenyl and nitrobenzol.
4. A dielectric material consisting of substantially equal parts of chlorinated diphenyl and nitrobenzol.

WILLIAM DUBILIER.